Patented Jan. 23, 1923.

1,442,917

UNITED STATES PATENT OFFICE.

KENNETH L. WEBER, OF AUGUSTA, GEORGIA, ASSIGNOR OF ONE-THIRD TO CHARLES WEBER, OF CINCINNATI, OHIO.

PROCESS FOR MAKING FLEXIBLE, NONBREAKABLE, TRANSPARENT, AND WATERPROOF WINDOWPANES.

No Drawing. Application filed August 5, 1921. Serial No. 490,158.

*To all whom it may concern:*

Be it known that I, KENNETH L. WEBER, a citizen of the United States, residing in Augusta, in the county of Richmond and State of Georgia, have invented a certain new and useful Process of Making Flexible, Nonbreakable, Transparent, and Waterproof Windowpanes, of which the following is a specification.

My invention relates to the production of a substitute for celluloid or other similar transparent material.

The object of my invention is to produce a composition of matter or material which I designate glasoid that will resemble celluloid in appearance and that may be used as a substitute therefor. This product is intended for use as window-panes in automobile curtains and the like, and is superior to celluloid now used for that purpose, because while it is flexible, it does not crack or break when folded or bent and does not become discolored or lose its transparency from prolonged exposure to the elements. It is also adaptable for use as film for moving pictures and the like, and is superior to the celluloid film, because it will not crack or break as easily, and also the fire hazard is much diminished as glasoid is not highly inflammable, and is not ignited by a spark, or exposure to heat, but must come into direct contact with a live flame, when it burns slowly, and is easily extinguished by blowing it out.

It can be used in many instances instead of glass, for instance, in picture frames, watch crystals and the like, where a transparent article is useful, which is not subject to cracking or breaking and could be used in place of glass in windows where cracked or broken glass is frequent. A piece of glasoid can be stretched in a rigid frame and used in a window or door and the like.

My invention consists in the process and product herein set forth.

The proportion or unit of measure for making glasoid of the consistency for use as window panes in automobile curtains, etc., is preferably as follows: one gram of refined, granulated, or so-called sparkling gelatine; five drops of glycerine; two drams of distilled water; one drop of formaldehyde and a sufficient quantity of pure waterproof or so-called spar varnish to form a suitable coating.

To make a piece of glasoid, one square foot in size, multiply the above by 22. If the piece is to be thinner, use less or if thicker, use more. The consistency of glasoid is varied by increasing or diminishing the proportion of glycerine. More glycerine increases the pliability and diminishing the glycerine makes it more brittle or hard and less pliable. The process of making the product is substantially as follows:

Provide a clean metal receptacle or pot in which to prepare the material ready for the mold. The mold may be made of highly polished surface like plate glass and can of course be of any shape or size desired. The mold is either coated with bees wax or preferably can be made of bees wax which is poured melted and allowed to become hard. This gives it a smooth surface and makes the mold level so that when the gelatine solution is poured onto it it is level, and, therefore, makes the glasoid of even thickness throughout. By using a bees wax mold the solution can be allowed to get thoroughly dry in the mold instead of hanging it up on a frame to dry.

To perform my process place a quantity of gelatine in the receptacle or pot, then add the glycerine, then add the distilled water, then heat slowly, stirring constantly until it comes to a boil, then remove the fire or heat, then skim off the scum, then add the formaldehyde, then strain through gauze or cheese cloth and pour into a mold, then remove any bubbles, etc., preferably with a pointed instrument, and allow the material to remain in the mold until thoroughly dry when it may be handled without tearing. After removing from the mold give it a coat on both sides of transparent pure waterproof or so-called spar varnish and then hang up in a frame to dry. When it is thoroughly dry it is ready to be cut in the desired shape and size and used.

Details of procedure in the manufacture may be varied, as for instance, the proceess of drying can be hastened by using artificially heated and dried air in a drying room, etc.; also the mold instead of being made entirely of bees wax may be of plate glass, or other smooth surfaced material, but when the latter is used it is necessary to remove the product from the mold before it is entirely dry and hang it in a frame until thoroughly dry, then remove from the frame and coat with transparent water-proof or spar varnish and then hang up again in a frame to dry.

It takes about 36 hours to make the finished product.

While it is preferable to finish the product with a coat of spar varnish, I do not desire to be limited thereto, as it may be treated on both sides with transparent water-proof material.

Glasoid can be made of any color, like red and green, etc., by adding appropriate dyes and it would then be adaptable for use for windows for dark room work, also for tail lights on automobiles, also for red and green signal lights, it being better than glass as it would not be breakable.

What I claim is new and desire to secure by Letters Patent is:

1. The herein described process which consists in placing a quantity of gelatine in a suitable receptacle, then adding a quantity of glycerine, then adding a quantity of distilled water, then heating slowly and stirring constantly until it comes to a boil, then removing from the fire or heat, then skimming off the scum, then adding formaldehyde, then straining through gauze or cheese cloth and pouring into a plate glass mold, then allowing the material to remain therein until dry enough to handle without tearing, then peeling the product from the mold, then coating it on both sides with pure transparent water-proof or so-called spar varnish, and then hanging it up in a frame to dry.

2. The herein described process which consists in placing a quantity of gelatine in a receptacle, then adding a quantity of glycerine, then adding a quantity of distilled water, then heating slowly and stirring constantly until it comes to a boil, then removing from the fire or heat, then skimming off the scum, then adding the formaldehyde, then straining and pouring into a mold, then allowing the material to remain therein until dry, then removing the product from the mold, and then coating it with transparent water-proof material.

3. The herein described process which consists in placing a quantity of gelatine in a clean metal receptacle, then adding a quantity of glycerine, then adding a quantity of distilled water, then heating and stirring until it comes to a boil, then removing from the fire or heat, then skimming off the scum, then adding the formaldehyde, then straining into a mold, then allowing the material to remain therein until dry, then removing the product from the mold and then giving it a finishing treatment with transparent water-proof material.

4. The herein described process which consists in placing a quantity of gelatine in a suitable receptacle, then adding a quantity of glycerine, then adding a quantity of distilled water, then heating and stirring until it comes to a boil, then removing from the fire or heat, then skimming off the scum, then adding the formaldehyde, then straining into a bees wax mold, allowing the material to remain therein until dry, then removing the product from the mold and then coating it with transparent water-proof material, substantially as set forth and for the purposes specified.

5. The herein described process which consists in placing in a suitable receptacle, the herein described ingredients in substantially the proportions given; about one gram of refined granulated or so-called sparkling gelatine, then adding about five drops of glycerine, then adding about two grams of distilled water, then heating slowly and stirring constantly until it comes to a boil, then removing from the fire or heat, then skimming off the scum, then adding about one drop of formaldehyde, then straining through gauze or cheese cloth and pouring into a bees wax coated mold, then allowing the material to remain therein until dry, then removing the product from the mold, then coating it on both sides with pure transparent water proof or so-called spar varnish and then hanging it up to dry.

6. The herein described process which consists in placing a quantity of gelatine in a receptacle, then adding a quantity of glycerine, then adding a quantity of distilled water, then heating and stirring until it comes to a boil, then removing from the fire or heat, then skimming off the scum, then adding the formaldehyde, then straining and pouring into the mold, then drying the material, then coating it with transparent water-proof material.

7. The herein described process which consists in placing a quantity of gelatine in a receptacle, then adding a quantity of glycerine, then adding a quantity of distilled water, then heating and stirring until it comes to a boil, then adding the formaldehyde, then adding a dye to give it a color, then straining and pouring into a mold, then drying the material and then coating it with transparent water-proof material.

KENNETH L. WEBER.